Feb. 2, 1971  W. F. FOSTER  3,559,343
SANDBLAST TRUCK

Filed July 5, 1968  4 Sheets-Sheet 1

INVENTOR.
Willard F. Foster
BY
Joseph P. Gastel
ATTORNEY.

INVENTOR.
Willard F. Foster
BY
Joseph P. Gastel
ATTORNEY.

Feb. 2, 1971   W. F. FOSTER   3,559,343
SANDBLAST TRUCK

Filed July 5, 1968   4 Sheets-Sheet 3

INVENTOR.
Willard F. Foster
BY
Joseph P. Gastel
ATTORNEY.

INVENTOR.
Willard F. Foster
BY
Joseph P. Gastel
ATTORNEY.

3,559,343
SANDBLAST TRUCK
Willard F. Foster, Alden, N.Y., assignor to C. H. Heist Corporation, Buffalo, N.Y., a corporation of New York
Continuation-in-part of application Ser. No. 658,558, Aug. 4, 1967. This application July 5, 1968, Ser. No. 748,130
Int. Cl. B24c 3/00
U.S. Cl. 51—8                         12 Claims

ABSTRACT OF THE DISCLOSURE

A sandblast truck including an enclosed truck body, an engine-driven compressor mounted crosswise within the truck body, a sandblast unit mounted within the truck body, a partition dividing the truck body into a first compartment for containing the compressor and a second compartment for containing the sandblast unit, the partition being removable in the event access is required to the side of the compressor, and doors in the side of the truck body for selectively permitting the compressor to be exposed to the air for cooling and air-intake purposes. In one embodiment a hopper is fixedly mounted on the floor of the second compartment for feeding a sandblast unit which extends downwardly through the floor of the truck.

CROSS REFERENCE TO RELATED APPLICATION

This application is a continuation-in-part of my application Ser. No. 658,558, filed Aug. 4, 1967, now abandoned.

BACKGROUND OF THE INVENTION

The present invention relates to an improved sandblast truck assembly.

By way of background, in the past extremely large compressors capable of providing compressed air in large quantities at extremely high pressures sufficient for sandblast purposes were usually towed to the sandblast site on a trailer on which it was permanently mounted. In addition, the sandblasting equipment was usually mounted on a vehicle which was separate from the trailer mounting the compressor, and the associated equipment for the sandblaster, including the sand supply and the various conduits, were not carried to the job in any specific way but were usually hauled in any way which was convenient at the time. All of the foregoing factors contributed toward inefficiency in sandblasting operations. More specifically, a relatively large amount of time was required to prepare the sandblasting equipment and assemble the various components and related equipment and supplies before the unit could be started. This was time-consuming and in the event emergency industrial sandblasting service was required, this service could not be rendered without a great delay. In addition, there was no known way of mounting an extremely large compressor and all of the related sandblast equipment on a relatively small truck which could be handled easily and driven into plant areas where the sandblasting was to be effected, and which also protected the cargo from the elements but permitted sufficient air to be supplied to the compressor for both compression and cooling of the engine driving the compressor, while also preventing the air flow to the portion of the truck housing the sandblast equipment so as not to blow the sand about. It is with overcoming the foregoing shortcomings of prior sandblasting equipment that the present invention is concerned.

SUMMARY OF THE INVENTION

The present invention relates to an improved sandblast truck.

It is accordingly one object of the present invention to provide an improved sandblast truck which is capable of carrying an extremely large engine-driven compressor and sandblast equipment including associated supplies on a relatively small enclosed truck so that it is protected against the elements, while also permitting selective exposure of the compressor to the atmosphere which serves both as a source of air to be compressed and for cooling the compressor, while also maintaining the compressor protected against inclement weather.

Another object of the present invention is to provide an improved sandblast truck having portions which can be disassembled easily for permitting access to the compressor which is housed in a relatively confined area.

A further object of the present invention is to provide an improved sandblast truck wherein the major portion of the compressed air piping is located externally of the truck body for easy access. Still another object of the present invention is to provide an improved sandblast truck having a permanent hopper mounted within a closed sandblast compartment for feeding a sandblast unit as required during operation while still permitting sufficient headroom in the sandblast compartment for easy access to the hopper during loading thereof. Other objects and attendant advantages of the present invention will readily be perceived hereafter.

The improved sandblast truck of the present invention includes an enclosed truck body having selectively openable sides, the truck body being divided into first and second compartments by a removable partition with the first compartment housing an extremely large compressor which is mounted with its longitudinal axis transverse to the longitudinal axis of the truck and the selectively openable sides serving to permit air to be supplied to the compressor for compression and compressor cooling. The partition which divides the first and second compartments can be removed, as required, to permit access to the compressor in the event this access is needed for repair work or the like. The second compartment, which houses the sandblaster and related equipment needed for sandblasting as well as the entire truck body, can be closed up so as to protect the contents of both compartment against the inclement weather thereby permitting the sandblaser to be used in the rain or the like considering that if it were exposed it normally could not be used in this manner. Furthermore, the entire truck can be loaded and be placed in condition ready to go out on a sandblasting assignment and can be on its way to a destination on short notice. In another embodiment of the invention the compressed air conduits are mainly located externally of the truck body, thereby permitting easy access thereto as well as leaving the inside of the truck body relatively unobstructed. In this embodiment the sandblast unit itself extends downwardly through the floor of the truck body and a hopper is fixedly mounted above the sandblaster. This hopper can be filled with sand to supply the sandblast unit for a relatively long period. Further, since the sandblaster extends downwardly below the floor, the center of gravity of the truck is maintained relatively low thereby providing greater stability to the truck in the event it is driven while the sandblaster is loaded. Furthermore, because of the location of the sandblaster there is a relatively large amount of headroom in the truck body to facilitate loading of the hopper. The various aspects of the present invention will be more fully understood when the following portions of the specification are read in conjunction with the accompanying drawings wherein.

DESCRIPTION OF THE PREFERRED EMBODIMENTS

Figure 1:
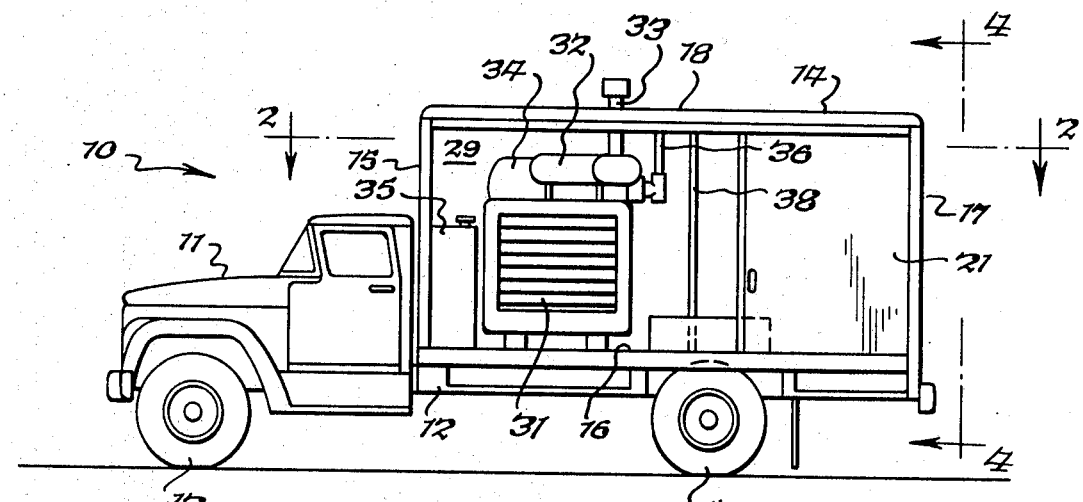
FIG. 1 is a side elevational view of the improved sandblast truck of the present invention with the side panels in an open condition exposing the compressor compartment.

The improved sandblast truck 10 of the present invention comprises a truck having a cab 11 mounted on frame 12 mounting wheels 13. A body 14 is mounted permanently on frame 12 and includes a front wall 15, a floor 16, a rear wall 17, a roof 18, and two sides. Each side includes a stationary panel 19 and two movable panels 20 and 21 which are slidable in tracks 22 and 23, respectively. As can be seen from FIG. 2, panels 19, 20 and 21 can be used to form a complete side wall on the truck body 14 or may be opened to expose a portion of the side of the truck. The rear wall 17 includes door panels 24 and 25 which are slidable in tracks 26 and 27, respectively, to permit access to rear compartment 28 which houses sandblast equipment, and is separated from front compartment 29 which houses a compressor 30. Compressor 30 includes a diesel engine (not shown) having a radiator 31 associated therewith as well as a muffler 32 and a tail pipe 33 which extends through roof 18. Also mounted on compressor 30 is a compressed air tank 34 which is suitably connected to the compressor. A diesel fuel tank 35 is also mounted in compartment 29 for supplying the fuel requirements of the engine which drives compressor 30. An outlet pipe 36 is connected to compressed air tank 34 and is also in communication with conduit 37 passing through partition 38 and leading to rear compartment 28. Conduit 37, in turn, is in communication with conduit 39 in the rear compartment which is coupled to a sandblast unit 40 of any conventional type and conduit 39 supplies the compressed air requirements thereto. As can be seen from FIG. 2, a valve 41 is also coupled to conduit 36 through T 42 and this valve can be used as a take-off for a compressed air line for use with equipment other than sandblast unit 40.

Figure 5:
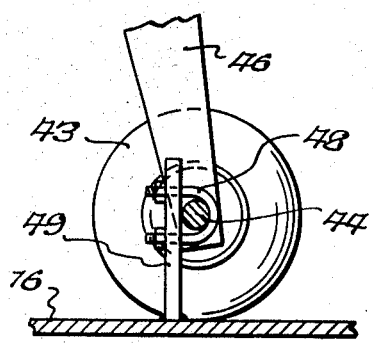
FIG. 5 is a view, partially in cross section, showing the manner of attaching the sandblast unit to the floor of the truck and taken substantially along line 5—5 of FIG. 2.

Sandblast unit 40 is mounted on wheels 43 which are in turn secured to axle 44 (FIG. 5) which in turn supports legs 46 of the sandblast unit 40. Another leg 47 is attached to the body of the sandblast unit proper. As can be seen from FIGS. 2 and 5, U-bolts 48 fasten axle 44 to spaced upstanding plates 49 which are welded to the floor 16 of the truck. This mode of attachment provides a convenient way of mounting sandblast unit 40 semipermanently on the truck but permits removal thereof in a very simple manner if this should be required for replacement or repair. At this point it is to be noted that the sandblast hose 50, which is shown in coiled condition stored on floor 16 in compartment 28, has a coupling 51 thereon for connection to coupling 52 leading from sandblaster 40. Compartment 28 also serves as a storage area for bags of sand 53.

Figure 2:
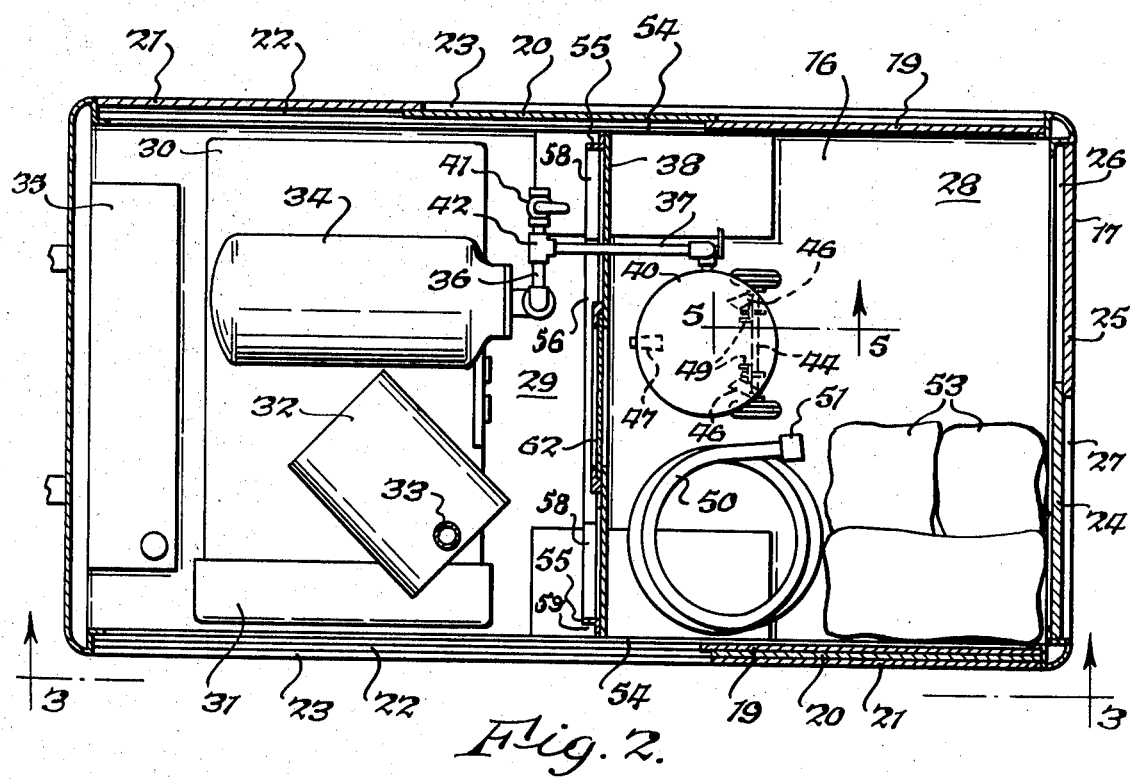
FIG. 2 is a cross sectional view taken substantially along line 2—2 of FIG. 1 and showing the orientation of the various sandblast components and related devices relative to the truck floor.
Figure 3:
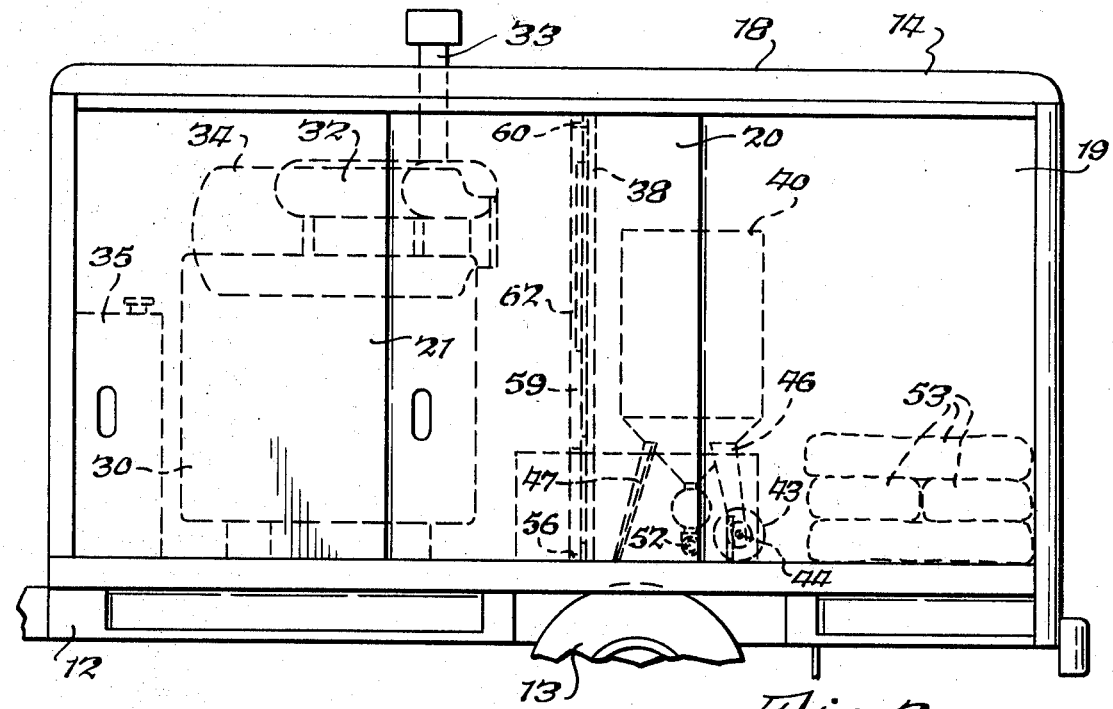
FIG. 3 is an enlarged side elevational view taken substantially in the direction of the arrows 3—3 of FIG. 2.

As can be seen from FIGS. 1 and 2, sliding doors 20 and 21 can be moved to the right to provide an opening in both of the side walls to thereby completely expose the opposite ends of compressor 30 which is mounted crosswise on the truck, that is, with its longitudinal axis extending substantially perpendicularly to the longitudinal axis of the truck body. This crosswise mounting serves a plurality of functions, namely, it permits a relatively long compressor to be mounted on a relatively short truck and further it permits air flow longitudinally of the compressor, this air flowing through the open sides of the truck when doors 20 and 21 on both sides are pulled back to overlie the panel 19 shielding the rear compartment 28. A fan, not shown, associated with radiator 31, aids in drawing air across compressor 30 for cooling purposes. The opening of the sides of the truck body also permits the air to flow into the intake of compressor 30, which consumes massive amounts of air which could probably not be supplied if the compressor were not exposed as much to the atmosphere as it is.

It can be appreciated that since compartments 28 and 29 are covered and since compartment 28 is shielded on all sides, the truck can be used in rainy weather because the compressor has roof 18 over it and the entry of rain or wetness into compartment 29 from the open sides will not substantially effect the operation of compressor 30. However, compartment 28 is totally shielded against the entry of rain when doors 24 and 25 are closed, to thereby protect the sand from the rain which would destroy its usefulness in sandblasting. This permits truck 10 to be used for sandblasting in inclement weather, a feat which cannot ordinarily be performed if the sandblaster 40 were in the open. As noted, the supply of sand is in rear compartment 28 as well as the hose 50 and as well as other equipment and tools, not shown, which are needed for satisfactory operation of the sandblaster.

The truck 10 can be loaded up ready to go so that it can be put on the road on very short notice for performing industrial sandblasting. It is also to be noted that the truck is relatively short and therefore can be maneuvered easily on the road as well as in plant areas where sandblasting is to be effected. At this point it is to be noted that panel 19 leaves portions 54 of side walls of the truck exposed when the doors 20 and 21 are drawn completely to the right. This permits the sandblast hose 50 to be extended out of the side of the truck, as well as through either of the open doors 24 or 25 at the rear of the truck.

Figure 4:
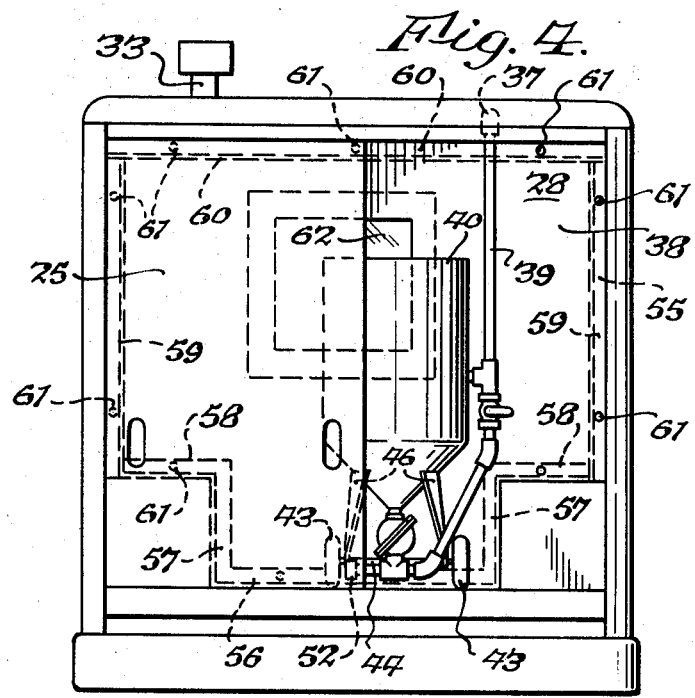
FIG. 4 is a view of the rear end of the truck taken substantially in the direction of arrows 4—4 of FIG. 1.
Figure 6:
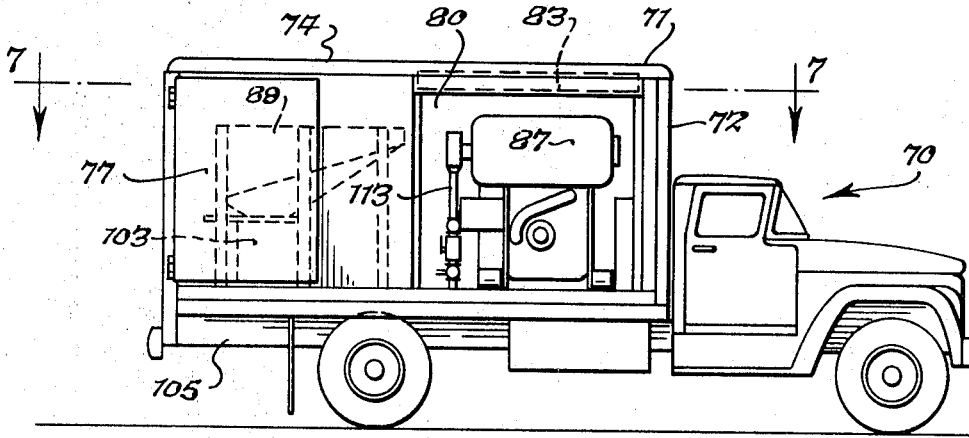
FIG. 6 is a side elevational view of an alternate type of sandblast truck made in accordance with the present invention.

Compartments 28 and 29 are separated by a partition 38 which is made of wood and is of a T-shaped configuration, as best can be seen from FIG. 4. Partition 38 abuts angle iron framework 55 mounted along the cross-sectional perimeter of the truck and extending substantially perpendicularly to the floor 16 and roof 18. More specifically, the framework 55 includes an angle 56 on the floor, angles 57 extending upright from angle 56 and welded to the ends thereof, angles 58 welded to the ends of angles 57 and extending horizontally therefrom, angles 59 welded to the ends of angles 58 and extending perpendicularly therefrom, and angle 60 extending between angles 59. Apertures 61 are located at spaced points on frame 55 for receiving screws or wing nuts or the like which attach partition 38 to frame 55 in a removable manner so that partition 38 can be removed in the event it is necessary to have access to the right side of compressor 30 for maintenance or repair, the amount of room between partition 38 and compressor 30 being normally inadequate for this purpose.

A window 62 is mounted in partition 38 to permit a sandblast operator in compartment 28 to view compressor 30, as for example to read the various gauges associated therewith. It is to be noted that partition 38 shields compartment 28 from compartment 29 and thus the massive air currents passing through compartment 29 will not in any way blow the sand around in compartment 28 to the discomfort of the sandblast operator and to the inefficiency of the sandblasting operation.

It can thus be seen that the improved sandblast truck of the present invention is highly versatile in that it can be used for sandblasting various industrial areas by merely driving the truck into such areas and this is possible because of its relatively small size, and, further, it provides a truck which can be used in all weather because the sandblast compartment can be enclosed against the entry of rain, and, further, the compressor during storage is enclosed in its own compartment and protected from dirt and dust, but this compartment can be opened easily and conveniently to permit air to be supplied to the compressor in the massive amounts required by it for cooling and as a source of the air which is to be compressed.

A modified embodiment of the present invention is shown in FIGS. 6 through 9. This embodiment includes a truck 70 having the usual cab and chassis as described above. However, the orientation of compartments is different. In this embodiment, truck body 71 includes front wall 72, floor 73, roof 74 and side walls 75 and 76. The rear of the truck is closed by doors 77 and 78 which are shown in the open position in FIG. 7. A partition 79 separates compressor compartment 80 from sandblast compartment 81. This partition may be removable as in the other embodiments or may be permanent if desired. An overhead sliding door 82 is mounted in side 75 and a sliding door 83 is mounted in side 76. Suitable tracks 84 guide doors 82 and 83 between open and closed positions. The doors are shown in the open position in FIG. 6 to expose the compressor 85 to the atmosphere for air supply and cooling purposes, as described above. Also housed in compartment 80 is a fuel tank 86. The compressor and its associated tank 87 may be identical in all respects to that described above relative to FIGS. 1 to 6 and therefore additional description will not be made at the present time, except for those portions which differ from the previous construction.

The sandblast equipment is housed in compartment 81. This equipment includes a hopper 88 having side walls 89, a front wall 90 and a rear wall 91. In addition, the hopper includes downwardly sloping bottom walls 92 and 93 flanked by inclined bottom walls 94 joining each side wall 89 to the other bottom walls. At the lowermost portion of the hopper is an outlet 95 covered by a screen 96 for preventing foreign material other than sand from passing therethrough. The hopper 88 is supported above floor 73 by three pairs of vertical spaced angles 97, 98 and 99. The angles 97, 98 and 99, which are removably bolted to floor 73 by bolts 99', rigidly support hopper 88 and are attached thereto by welding. As can best be seen from FIG. 7, the vertical legs of angles 97 and 98, which are transverse to the longitudinal axis of the hopper, underlie and engage either walls 94 or wall 92 for providing support thereto. Built across the top of hopper 88 and welded thereto is a gridwork of bars 100 and 101. This permits a sandblast operator to rest a bag of sand 102 on top of the gridwork and thereafter open the bag to permit the sand to drop into the hopper. This facilitates handling of the sand and obviates the necessity for the sandblast operator to balance the bag of sand on the edge of the hopper when dumping it into the hopper.

A conventional sandblast unit 103 extends through a hole in floor 73 so that its lower portion 104 is situated between the spaced beams 105 of the truck. Suitable supporting members 100' and bolts 101' removably mount the sandblast unit 103 in position. This unit may be of any conventional type and in this instance is one manufactured under the trademark Clemco, Model No. SC2452 which is manufactured by Clemco-Clementina Ltd. of San Francisco, Calif.

Because the sandblast unit 103 extends below the floor 73 of the vehicle, a relatively low center of gravity is maintained considering that the sandblast unit may be partially full of sand after the completion of a job. Furthermore, by situating sandblast unit 103 in the foregoing manner, sufficient headroom can be left above hopper 88 to permit the sandblast operator to dump the sand into the hopper. Furthermore, in certain situations there may even be some sand left in the hopper 88 itself after the termination of a sandblasting operation and by virtue of the fact that it is relatively low, the center of gravity will be maintained at a lower point than if the entire sandblast unit 103 was above the floor 73. It is also to be noted from FIG. 7 that the hopper 88 and sandblast unit 103 are located on the longitudinal axis of the truck, thereby further placing the center of gravity at a central location which will tend to obviate unbalancing of the truck while it is being driven.

A slide valve 106 having upstanding handle 107 at the end thereof is mounted in frame 108 on top of sandblast unit 107. When plate 106 is withdrawn from opening 95 at the bottom of the hopper, sand may drop from the hopper into a sandblast unit. When plate 106 is moved to the right so that solid portion 110 is in alignment with hopper opening 95, there will be no sand flow. Frame members 111 contain slots 112 to permit the sliding of plate 106 between its open and closed positions. As is well understood in the art, the hopper 88 will supply sand to sandblast unit 103 on demand. When sandblasting is actually being effected, the sand inlet (not shown) to unit 103 will automatically be closed so that sand cannot enter it. When sandblasting is temporarily stopped, the inlet (not shown) in the top of sandblast unit 103 will open to permit sand to drop into the unit until the level of sand rises to opening 95. By the use of the hopper in conjunction with the sandblast unit, enough sand can be stored for a good number of hours of sandblasting, without requiring an attendant to constantly reload the sandblast unit 103 as its supply diminishes.

As will become more apparent hereafter, the compressed air circuit permits the attachment of the sandblast hoses and auxiliary equipment externally of truck body 74. Thus, the various sandblast conduits and compressed air conduits need not occupy any valuable space within the truck body itself. The main outlet conduit 113 (FIGS. 6 and 8) leads from compressed air tank 87 to blow-off valve 114 which is opened during the starting of the compressor. A compressed air conduit for auxiliary equipment maybe attached to outlet 115 of this valve. When the sandblast equipment is being operated, valve 114 is closed. In communication with valve 114 is valve 116 which must be open when sandblasting is being effected. However, it is closed when the sandblaster 103 is not being used. A conduit 117 leads from valve 118 which is in communication with valve 116. Conduit 117 extends through floor 73 and is in communication with conduit 119 which in turn is in communication with fitting 120 attached to the sand outlet of sandblast unit 103 through T 121. T 121 places the inside of sandblast unit 103 into communication with conduit 119 through conduit 122, conduit 123, valve 124 and air filter 125. This pressurizes the inside of sandblast unit 103 whenever valve 124 is opened. Conduits 119 and 122 may be flexible hoses which are clamped to the conduits with which they are in communication. As is well known, sand drops into the airstream passing through fitting 120 when sandblasting is being performed. At this point it is to be noted that the main sandblast hose fits onto coupling 126 at the end of conduits 127 which is in communication with fitting 120 and that coupling 126 is external of truck body 74 for convenience in the coupling and uncoupling of the hose. Furthermore, it is to be noted that a coupling 128 is mounted at the end of conduit 129 which is in communication with valve 124 and that conduit 130 leads to valve 118. A deadman's type of safety control (not shown) fits onto coupling 128 and when it is actuated simultaneously with the control to permit compressed air to be fed to the sandblast hose from coupling 126, valve 124 will be opened to pressurize sandblast unit 103 and close a port (not shown) which admits sand into sandblast unit 103 in the conventional manner.

Mounted on floor 73 behind sandblast unit 103 is a compressed air filter 131 which receives compressed air from conduit 113 via valve 132 and conduit 133. Filter 131 cleanses the compressed air from oil and other toxic substances so that it is fit for human breathing. Conduit 134 leads to coupling 135 to which a hose leading to the face mask worn by a sandblast operator is connected to supply him with clean air for breathing during the sandblasting operation.

Figure 7:
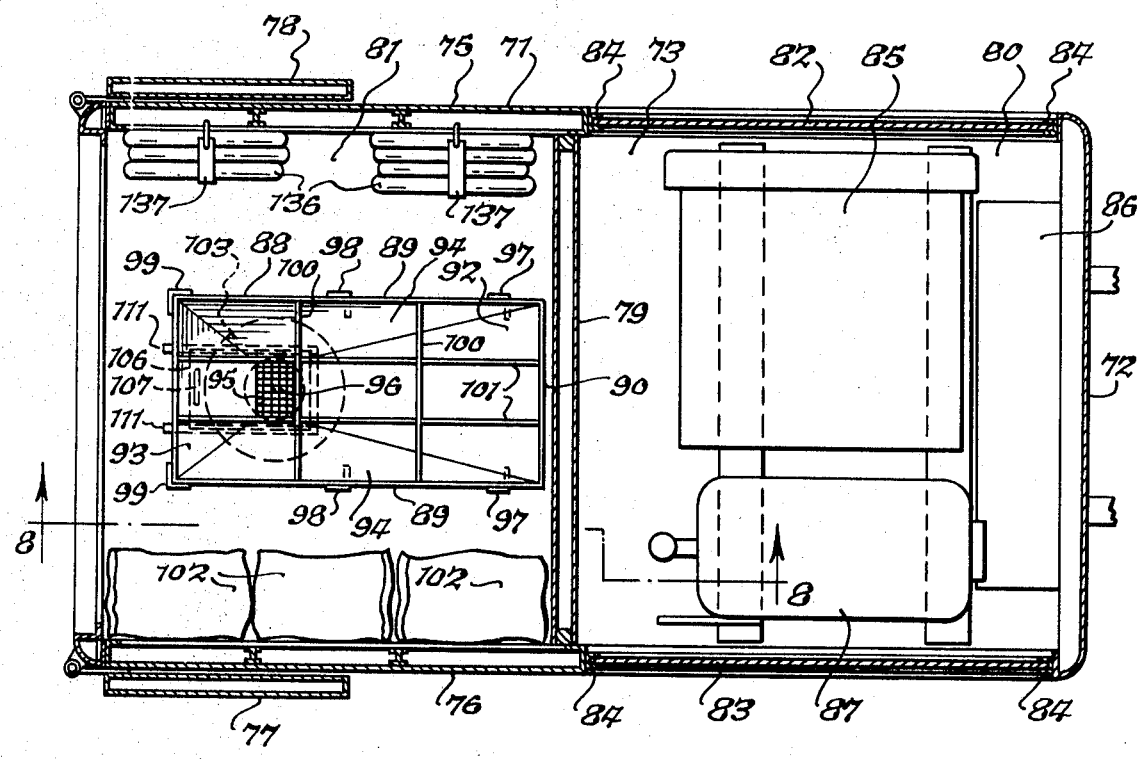
FIG. 7 is a view, partially in cross section, taken substantially along line 7—7 of FIG. 6.
Figure 8:
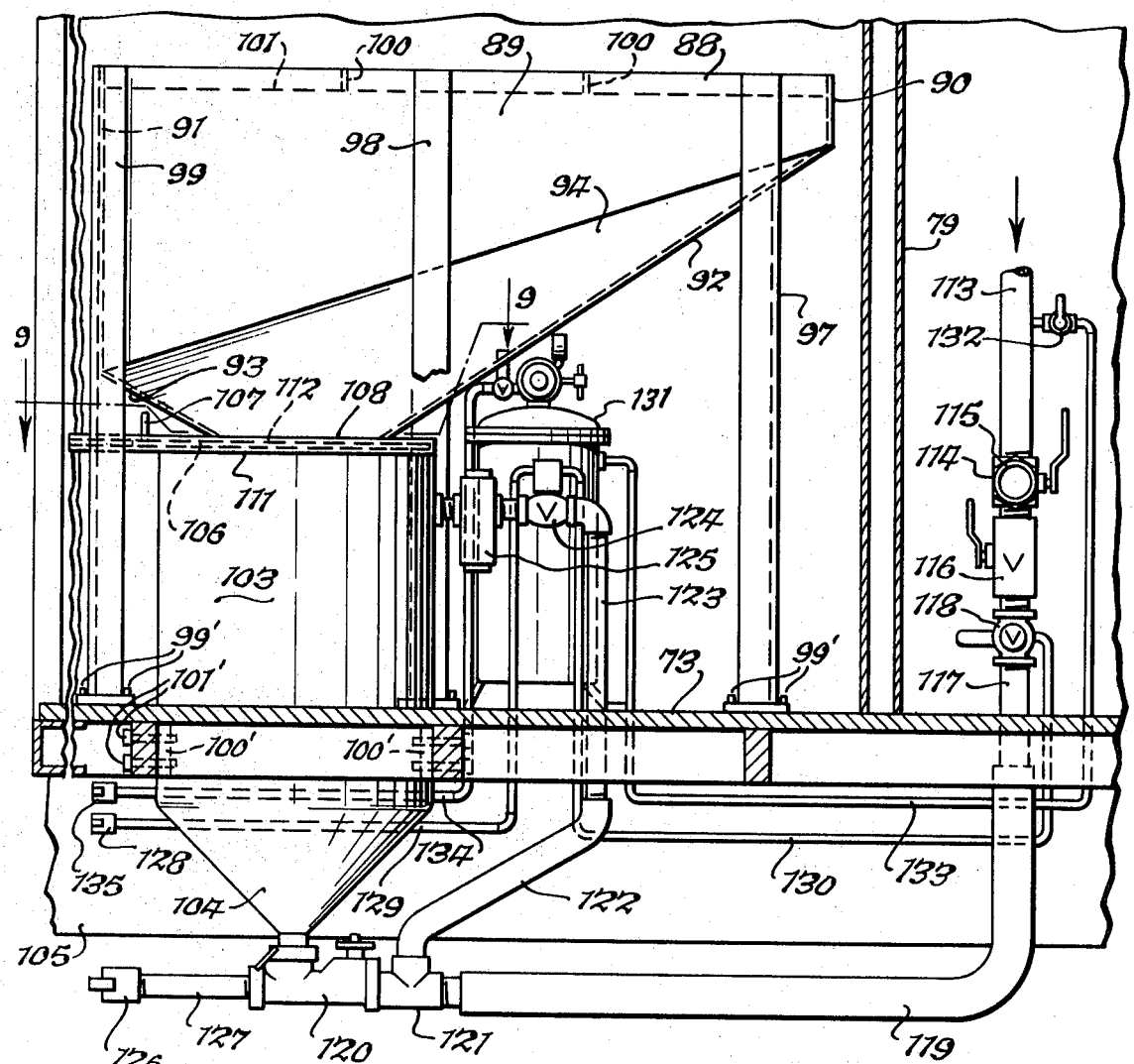
FIG. 8 is a view partially in cross section taken substantially along line 8—8 of FIG. 7 and showing the orientation between the hopper and the sandblast unit.
Figure 9:
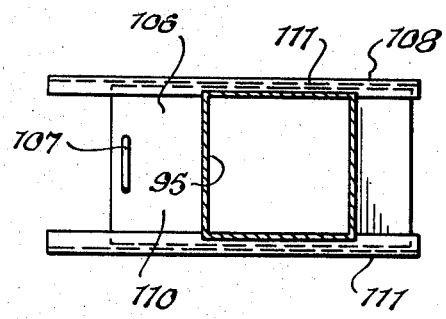
FIG. 9 is a view taken substantially along line 9—9 of FIG. 8 and showing the gate valve at the bottom of the hopper.

As can be seen from FIG. 7, compartment 81 is used to store bags of sand 102 and also sandblast hoses 136, which are mounted on the sides of the truck body by means of suitable straps 137 when not in use.

It is to be noted that the general orientation of the sandblast equipment and the compressor in FIGS. 6 through 9 is generally the same as in FIGS. 1 to 6 and that the primary difference between the two embodiments is in the orientation of the compressed air conduits and the use of the hopper in conjunction with the sandblast unit.

What is claimed is:

1. A sandblast truck assembly including an enclosed truck body, compressor means mounted within said truck body, a sandblast unit mounted in said truck body, conduit means for effecting communication between said compressor means and said sandblast unit, and partition means for dividing said truck body into first and second compartments, with said compressor means being located in said first compartment and said sandblast unit being located in said second compartment and being confined against the elements to permit use of said sandblast unit in inclement weather.

2. A sandblast truck assembly as set forth in claim 1 including means for removably mounting said sandblast unit in said second compartment.

3. A sandblast truck assembly as set forth in claim 1 including opening means in said truck body for selectively opening said first compartment to the atmosphere to thereby provide air flow to said compressor.

4. A sandblast truck assembly as set forth in claim 3 wherein said truck body includes a front wall, a pair of said walls, a roof, floor, and a rear wall, and wherein said opening means comprise panels which are located in opposition to each other in said side walls to permit air flow across said compressor.

5. A sandblast truck assembly as set forth in claim 4 wherein said truck body includes door means for selectively entry and egress from said second compartment.

6. A sandblast truck assembly as set forth in claim 5 including means removably mounting said partition in said truck body.

7. A sandblast truck assembly as set forth in claim 6 including means for removably mounting said sandblast unit in said second compartment.

8. A sandblast truck assembly as set forth in claim 4 including means removably mounting said partition in said partition in said truck body.

9. A sandblast truck assembly as set forth in claim 3 including means removably mounting said partition in said truck body.

10. A sandblast truck assembly as set forth in claim 3 wherein said truck body includes a floor, and wherein said sandblast unit includes a portion which extends below said floor, and a hopper in said second compartment mounted above said sandblast unit.

11. A sandblast truck assembly as set forth in claim 10 including a compressed air conduit in said first compartment in communication with said compressor means, and conduit means in communication with said compressed air conduit extending underneath said floor and in communication with the portion of said sandblast unit which is below said floor.

12. A sandblast truck assembly as set forth in claim 10 wherein said sandblast unit and said hopper are located substantially along the longitudinal axis of said truck body.

References Cited
UNITED STATES PATENTS

| | | | |
|---|---|---|---|
| 847,270 | 3/1907 | Wise | 51—12 |
| 1,354,570 | 10/1920 | Lamping et al. | |
| 2,684,558 | 7/1954 | Harris et al. | 51—8 |
| 2,741,878 | 4/1956 | Morain | 51—8X |
| 3,075,319 | 1/1963 | Blubaugh | 51—8 |
| 3,399,492 | 9/1968 | Crowe et al. | 51—8 |

LESTER M. SWINGLE, Primary Examiner